United States Patent [19]
Enabnit et al.

[11] 3,922,661
[45] Nov. 25, 1975

[54] CONVEYOR BELT PROTECTION CONTROL AND INDICATING SYSTEM

[75] Inventors: Robert S. Enabnit, Akron; Kenneth A. Spriggel, Uniontown, both of Ohio

[73] Assignee: The Goodyear Tire & Rubber Company, Akron, Ohio

[22] Filed: Dec. 28, 1973

[21] Appl. No.: 429,456

[52] U.S. Cl. .......................... 340/259; 198/232
[51] Int. Cl.² .................................. G08B 21/00
[58] Field of Search .......... 340/259; 198/232, 40; 226/11, 100

[56] References Cited
UNITED STATES PATENTS

| | | | |
|---|---|---|---|
| 3,636,436 | 1/1972 | Kurauchi et al. | 340/259 |
| 3,742,477 | 6/1973 | Enabnit | 340/259 |
| 3,792,459 | 2/1974 | Snyder | 198/232 |
| 3,831,161 | 8/1974 | Enabnit | 226/11 |

*Primary Examiner*—Glen R. Swann, III
*Attorney, Agent, or Firm*—F. W. Brunner; L. A. Germain

[57] ABSTRACT

An electronic control system for conveyor belts monitors the condition of embedded sensor conductors in the belt and provides a warning indication and/or shutdown of the conveyor when damage occurs to the belt or control circuitry. The system comprises means to shut down the conveyor, system condition indicators, an automatic circuit failure bypass that shows when the system is defeated and the conveyor is running unprotected, and a sensor-loop skip selector that allows the conveyor to continue operating in a protected mode even when multiple sensor loops are destroyed.

15 Claims, 8 Drawing Figures

CONVEYOR BELT PROTECTION CONTROL AND INDICATING SYSTEM

Background of the Invention

This invention relates generally to monitoring control systems and more specifically to a conveyor belt condition monitoring system that provides alternative operating modes when damage has occurred to the conveyor belt or the control circuitry.

Heretofore, many and various schemes have been proposed for sensing and indicating conveyor belt damage. These prior art schemes provide for a sensor to be embedded in the conveyor belt and detector circuitry to monitor the condition of the sensor. Damage occurring to the moving belt affects the sensor in a manner such that a warning signal is generated in the detector, and shutdown of the conveyor is initiated so that extensive belt damage does not result. Systems of this general type are illustrated and described in U.S. Pat. Nos. 3,731,113 and 3,742,477 and although the operation of these is satisfactory, they suffer from a lack of operative flexibility as do other prior art systems. For example, systems of the type described in the beforementioned patents are effectively applied to mining and ship cargo handling applications wherein heavy loads are transported via the belt conveyor over extremely long distances. In this type application, it may not be desirable or even practical to immediately shut down the system as soon as damage occurs to the belt. If the damage to the belt is of a minor nature, but sufficient to affect an embedded sensor such that a warning signal is generated in the detector, it may be desirable to continue running the conveyor until it is more advantageous to effect necessary repair work. Furthermore, in some instances, if the belt is carrying an extreme load, it may be necessary to complete unloading of the damaged portion before repairs may be made.

Summary of the Invention

A principal object of this invention is to overcome the deficiencies in the prior art systems by providing a conveyor belt protection control and indicating system that affords substantial flexibility in its operation.

In accordance with this objective, a control system for conveyor belts is provided comprising a plurality of sensors embedded in the belt, detector circuitry to monitor the condition of the sensors, a visual warning indicator, means to shut down the belt, an automatic circuit failure bypass and indicator that shows when the system is defeated and running unprotected, and a sensor skip selector that allows the conveyor to continue operating in a protected mode even when a number of sensor loops are destroyed.

Description of the Drawings

The features of the invention may best be understood from a consideration of the following description taken in conjunction with the accompanying drawings, in the several figures of which like reference numerals identify like elements, and in which.

Detailed Description of the Invention

Figure 1:
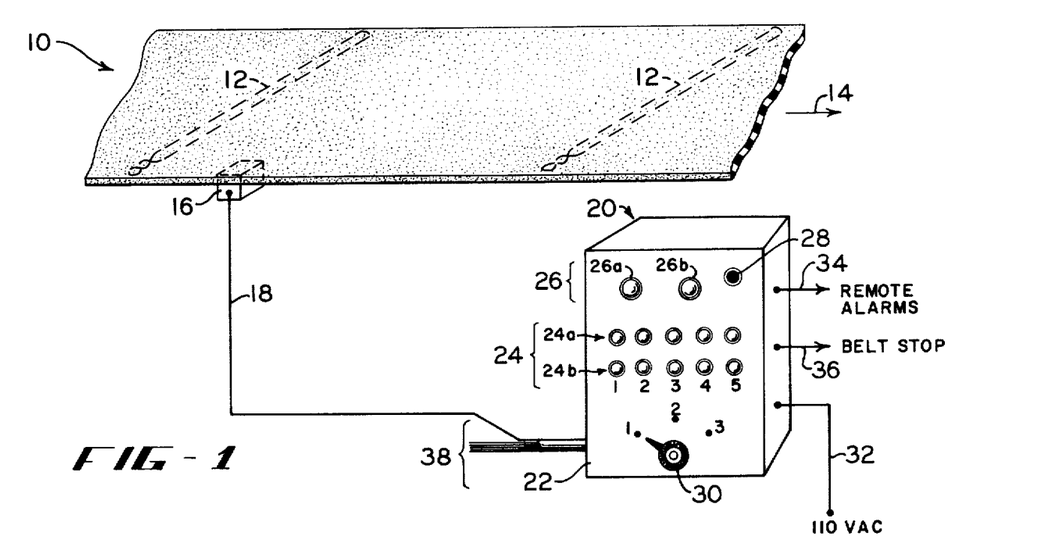
FIG. 1 pictorially illustrates the arrangement of the system components.

In FIG. 1, a conventional belt conveyor 10 is shown with a plurality of sensor wires 12 embedded in the belt transverse to the direction of belt motion indicated by the arrow 14. The sensors are close-circuited conductive wire loops of the type described in U.S. Pat No. 3,742,477 which effect a detection signal in a detector circuit 16 via inductive coupling that exists during the proximate presence of sensor loop relative to the detector circuit. The manner of operation of these elements is clearly described in the beforementioned patent and a further embodiment is also taught in a copending application entitled, "Fail-Safe Monitoring Apparatus" and identified by U.S. Pat. 3,831,161, issued Aug. 20, 1974. The adaption of either of these condition monitoring devices to the present invention will become apparent to persons knowledgeable in the art.

To continue with the description, the detector circuit 16 provides output signals on line 18 to a system controller generally indicated at 20. The controller includes a panel display 22 that provides a constant visual indication of the system operation. Included in the control system and part of the display 22 are site indicators 24, defeat indicators 26, a manual defeat switch 28, and a loop skip selector switch 30. The purpose and operation of these controls will be made clear as the description proceeds. The controller 20 receives power from a 110-volt a.c. source via line 32 and provides output signals 34 to remote alarm devices and to the conveyor drive motor circuits (not shown) via line 36 for system "shut-down".

Although only a single detector 16 is shown in FIG. 1, additional detectors may be placed at other locations along the length of the conveyor. Each of these detector stations or "sites" feed input signals 18 to the controller 20 as indicated at 38. The controller is responsive to each of the "site" signals and provides a condition indication for each site 16 via visual indicators 24. The site indicators 24 comprise green lamp indicators 24a for "normal" condition indication and red lamp indicators 24b for an "abnormal" condition or warning indication.

The defeat indicators 26 on the control panel 22 provide a visual indication via a blue lamp 26a that the system is in operation. An automatic defeat feature, which will be more fully described as the description proceeds, will keep the conveyor running but a yellow lamp 26b will be lit to signify that the belt is running unprotected and the protection control system circuitry is malfunctioning and needs repair. In addition, a manual defeat switch 28 is provided for complete flexible operation of the system.

In the event that belt damage occurs that effectively severs one or more of the loop conductors 12 and it is desired to continue running the conveyor, a loop-skip feature is provided via selector switch 30. In this circumstance, the belt damage may be minor or else immediate repair cannot be made and, therefore, it would be desirable to continue running the conveyor. To accomplish this, the loop-skip selector switch 30 is dialed to the number of desired skips, for example 2, and the system will continue to operate as long as no more than two consecutive conductive loops 12 are severed. A more detailed description of the circuit operation will be made with respect to FIG. 6.

Figure 2:
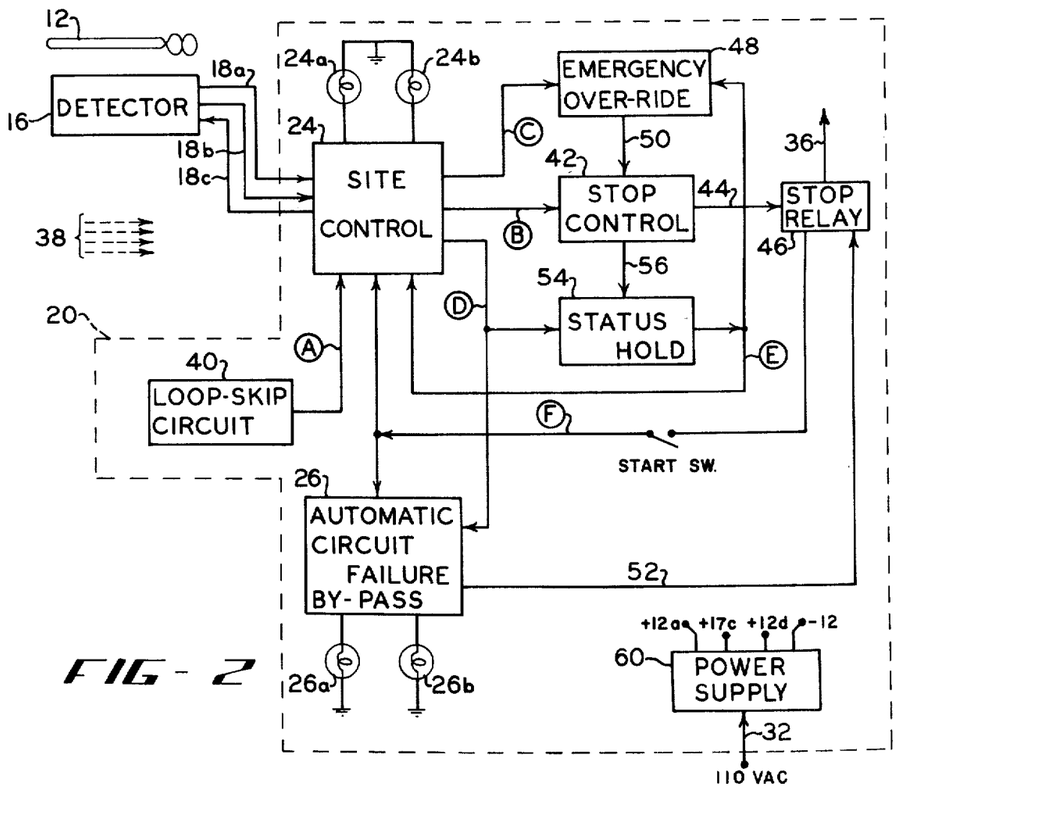
FIG. 2 is a general block diagram showing the arrangement of the various components and the signal flow therebetween.

FIG. 2 more fully shows the connections and signal flow between various elements of the control system 20. In the figure, close-circuited conductive sensor loops 12 pass proximate a detector circuit 16 that provides an output chain of regular occurring or periodic pulses on line 18a to the site control 24. Each pulse received by the site control 24 resets a linearly rising ramp voltage back to zero. Missed or absent pulses due to open-circuited loops 12 permit the ramp voltage to rise beyond a set reference value as established by a loop-skip circuit 40 via a loop-skip bus designated (A). Varying the loop-skip reference permits 0, 1, or 2 loops etc. to be missed before the ramp voltage exceeds the reference value. When the reference is exceeded, the indicator status for that particular "site" is changed from a "condition normal" green lamp 24a indication to a "condition abnormal" red lamp 24b indication.

A normally positive signal, on the belt-stop bus designated (B), is driven negative by virtue of the ramp voltage exceeding the reference level. Normally, the positive level signal on bus (B) is supplied to a stop control circuit 42 that maintains an output current on line 44 to keep a stop relay 46 activated and a belt stop circuit (not shown) supplied by line 36 "closed" and the belt running. When, however, the signal on bus (B), goes negative, the reverse occurs, i.e. the stop relay is inactivated, the belt stop circuit is opened, and the belt is stopped.

The ramp voltage at the site control 24 is also conveyed to an emergency override circuit 48 via an override bus (C) that controls operating current to the stop control 42 via line 50. If the site control 24, by reason of failure, cannot recognize an extensive excursion of the linear ramp voltage beyond the reference voltage level supplied by the loop-skip circuit via bus (A), the override 48 will cause the stop relay 46 to open by means of a signal to the stop control 42 and the belt will be stopped when the ramp voltage approaches a maximum value.

An automatic circuit-failure bypass 26 is provided that monitors the detector, power supplies, site control ramp generation, etc. all of which affect the signal level appearing on a system-fail bus designated (D). When the signal level on this bus changes by virtue of a failure of one or more of the beforementioned interconnected circuits, the action of the stop relay 46 is defeated by a signal on line 52 and the belt continues to run. The changed status is indicated by switching the defeat indicators from a "normal" blue lamp 26a indication to a "failure" yellow lamp 26b indication.

When a plurality of detector "sites" 16 are involved as indicated at 38, the loop-skip bus (A), belt-stop bus (B), override bus (C), system-fail bus (D), status-hold bus (E), and start bus (F) are common to each site control 24. A status-hold circuit 54 is provided for mulitple site control systems wherein the indicating status of all sites is frozen by the interconnected signal on bus (E) when any one of the sites indicates a system failure via the failure bus (D) or a belt failure via line 56 from the belt stop control 42.

Figure 8:
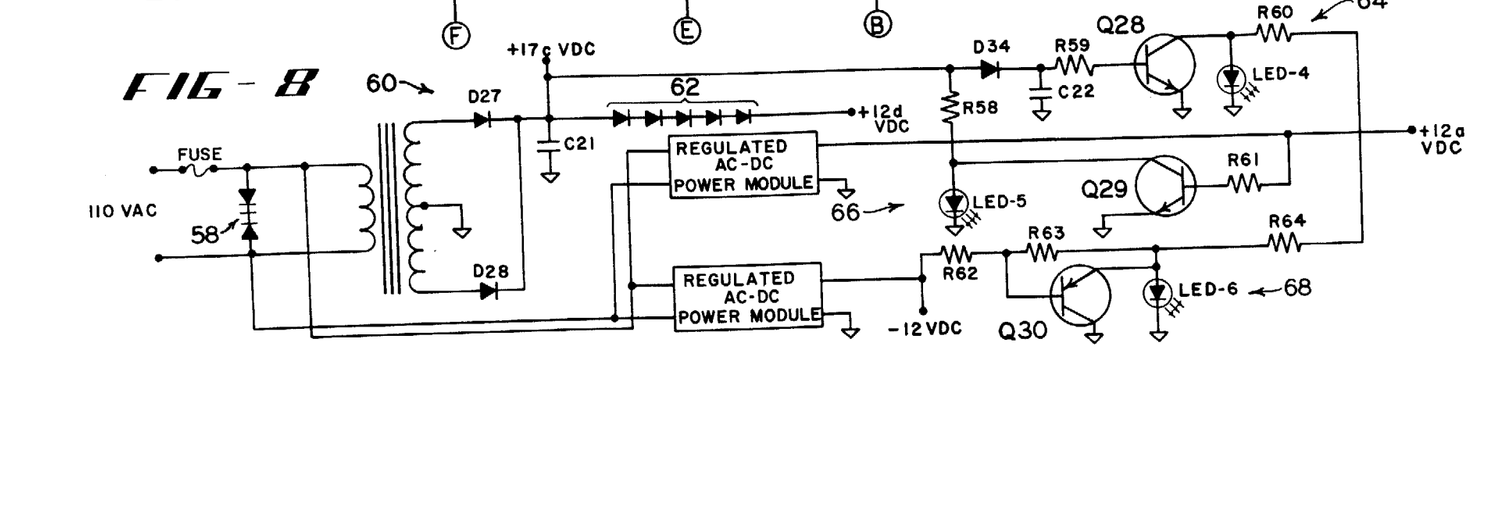
FIG. 8 is an electrical schematic of the power supply or the system illustrated in FIG. 2.

A power supply 60, more fully illustrated in FIG. 8, is a conventional element and includes a G.E. thyrector 58 to protect the system from power line transient voltage spikes. A string of diodes 62 in series with one of the main supplies is used to reduce the level of voltage to the system indicating lamps, and LED status indicators 64, 66, and 68 are used to indicate the absence of any one of the respective main voltages by lighting the appropriate LED. In each case, normal power will cause the appropriate transistor to conduct thereby shorting the LED. In the absence of power from any one supply, alternate supplies will supply current through that particular indicator. Due to pulsations remaining on the main supply, transistor Q28 derives its input voltage through a diode 34 and capacitor C22 which forms a filter to prevent flickering of LED-4 in normal operation. Voltage regulation is provided by a pair of miniature AC-DC power modules. These devices are made by the Acopian Corp., Easton, Pa.

Figures 3, 4:
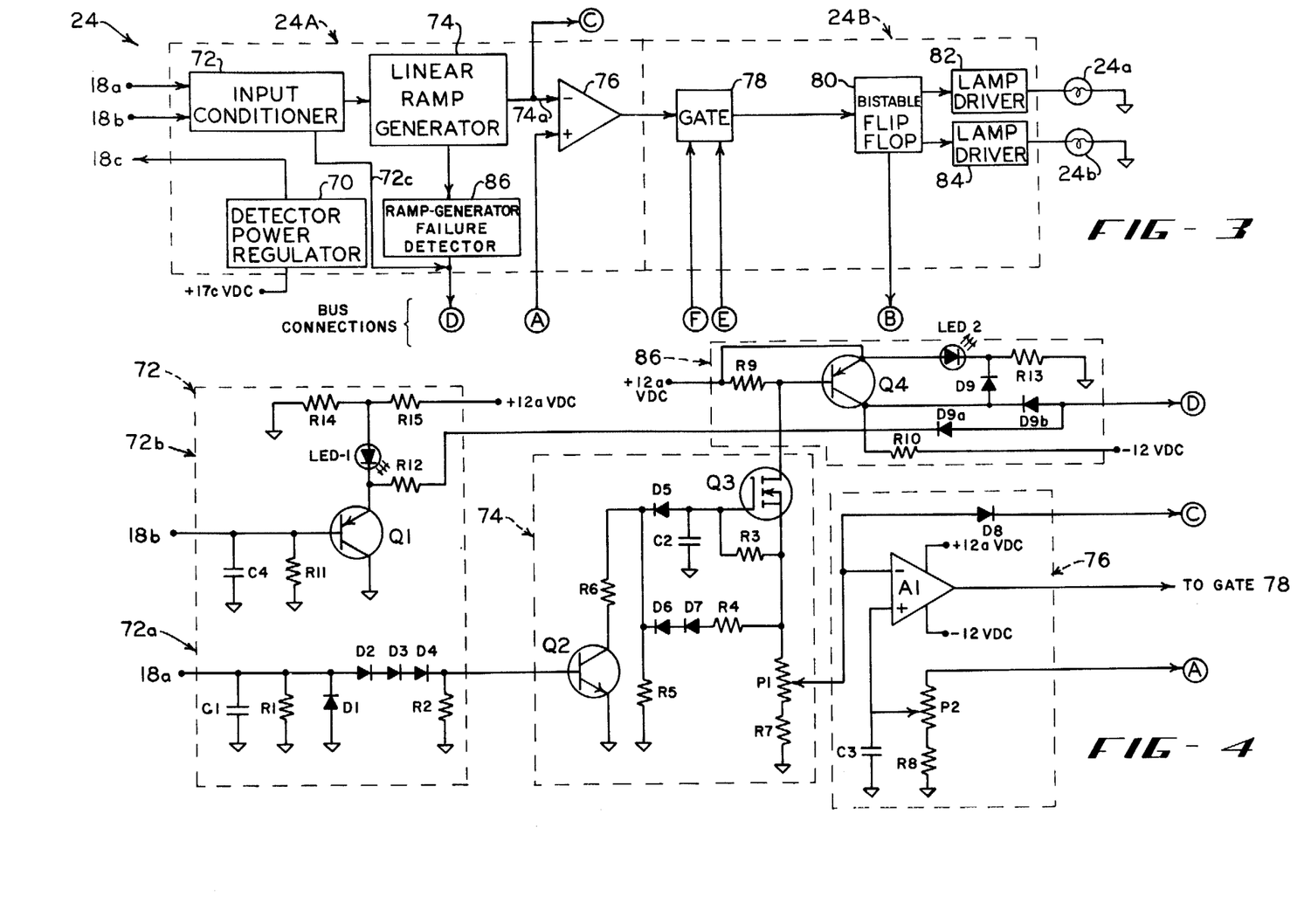
FIG. 3 is a block diagram of the site controller of FIG. 2.
FIG. 4 is an electrical schematic of the section 24A circuit for the site controller of FIG. 3.
Figure 5:
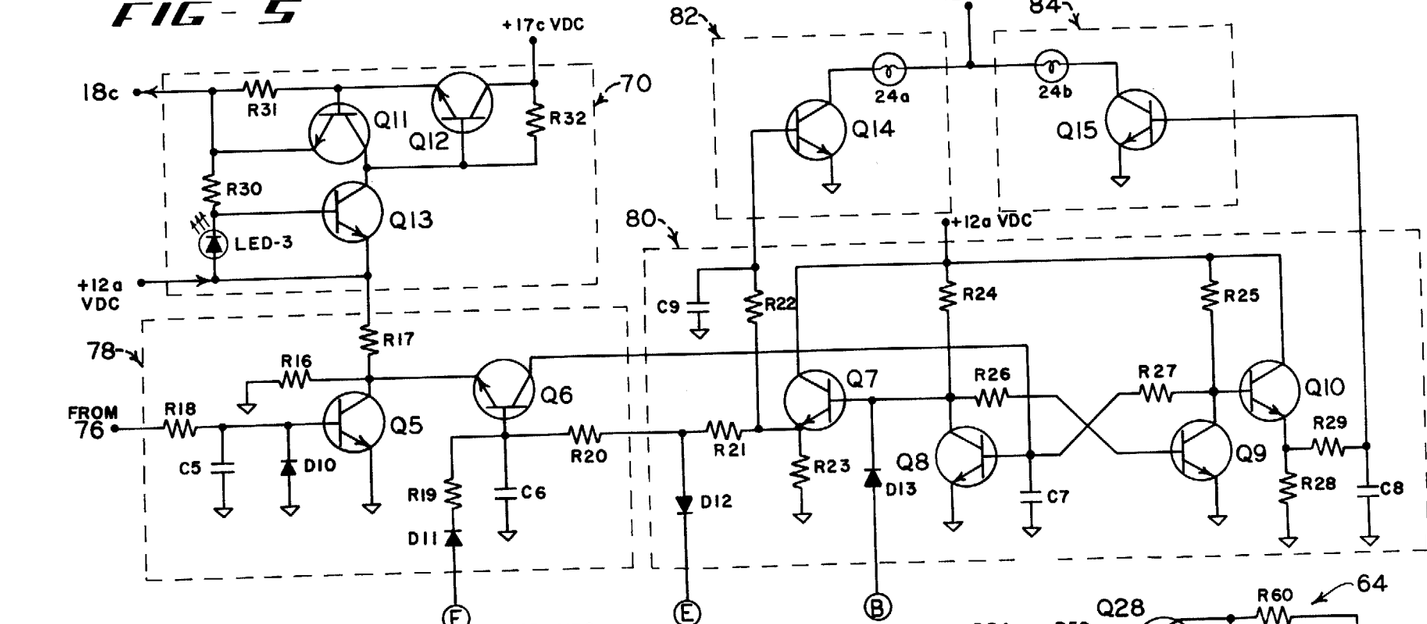
FIG. 5 is an electrical schematic of the section 24B circuit for the site controller of FIG. 3.

In FIG. 3, the component parts of a site control unit 24 are shown in block diagram form as including a 24A section and a 24B section with more specific circuit schematics for each section being ilustrated in FIGS. 4 and 5, respectively. As shown in FIG. 3, a detector power regulator 70 is provided to supply a regulated voltage obtained from the +17c VDC level of the principal power supply 60, to the detector 16 via line 18c. The detector output consisting of a series of pulses generated by the proximate passage of conductive loops 12 and having the periodicity of the loops, is applied to an input conditioner 72 along line 18a. Similarly, a signal which represents the continuous oscillation of the detector oscillator (as described in U.S. Pat. No. 3,742,477) is supplied to the input conditioner 72 on line 18b.

As more specifically shown in FIG. 4, the input conditioner 72 comprises a detector input conditioning circuit 72a and a detector failure sensing circuit 72b. The exact operation of these circuits will be more fully described hereinafter.

The principal purpose of the conditioner 72 is to remove spurious pulses which may act similarly to pulses from the detector signal. The periodic detector pulses on line 18a are applied to reset a linear ramp voltage generator 74. It should be evident that the pulse interval will determine the amplitude which the ramp can achieve. The peak ramp voltage is compared in an operational amplifier circuit 76 operating in a differential mode with the input level from the loop-skip bus (A) which is determined by the setting of the loop-skip control 30. As long as the ramp voltage is reset before the level exceeds the level on the (A) bus, the op-amp output signal which is passed through a gate circuit 78 keeps a bistable flip-flop 80 in a state to activate the green lamp driver 82 and maintain a condition "normal" indication by lighting green lamp 24a. Should the linear ramp generator output 74a exceed that of the bus (A) input to the op-amp 76, the signal passed through the gate 78 will switch the flip-flop 80 to its opposite state such that red lamp driver 84 activates red lamp 24b for an "abnormal" condition indication. Simultaneously, a belt stop signal is applied from the flip-flop 80 to the stop bus (B). The loop skip bus level (A) may be set by the loop skip control 30 to permit a pulse interval of 1, 2, or more steps. A ramp generator failure detector circuit 86 is utilized to determine that the linear ramp generator 74 is actually operative and, if not, to supply an indicating signal to the fail bus (D), and thereby bypass the stop circuitry. Should any component in the op-amp 76, gate 78, or flip-flop 80 fail so that an excessive ramp voltage 74a cannot provide a belt stop signal on bus (B) resulting from open-circuited belt loops 12, an ultimate ramp level will be reached which will activate the emergency override bus (C) and this will also cause the belt to be stopped. In addition to the beforementioned circuit component failures, the detector circuit is monitored by a sensing circuit 72b that also sends a signal on line 72c to the fail bus (D). Signals from the status-hold bus (E) are used to close the gate 78 in response to activation from another one of multiple site controls 24 thereby preventing each independent site control from changing the status of its own indicating circuitry if one of the others has prior option. A signal on the start bus (F) resets all gates to the open state.

FIG. 4 more specifically illustrates the component circuits of section 24A of FIG. 3. At the detector input 18a to the conditioner 72, a capacitor C1 is used to filter out high frequency transients, resistor R1 is used as a load for the detector output circuitry, diode D1 protects the input of transistor Q2 from excessive negative going noise spikes, and diodes D2, D3, and D4 provide a voltage threshold control to eliminate the effect of background noise so that only wanted signal levels will energize Q2 while R2 provides a diode load so that the diode series voltage drop is maintained at the desired level.

In the ramp generator circuit 74 the current path through the FET Q3 and its associated resistors provides a voltage at the junction of the potentiometer P1 and R3. This voltage is applied to capacitor C2 via R3 causing C2 to charge. The current through R3 is held nearly constant by using the voltage developed across this resistor as bias for FET Q3. With constant charging current, the voltage on C2 increases linearly, and the main FET current, hence the voltage across P1, R3 follows this level. Since the voltage on the emitter of Q3 is always slightly above that on the capacitor C2, this same voltage, when fed back through a network comprised fo resistor R4, diodes D6 and D7, and resistor R5, provides a voltage at diode D5 which is slightly higher than that on C2 and this reverse bias prevents C2 from discharging through D5. In this circumstance, the voltage on C2 rises linearly to saturation. However, an auxiliary circuit comprising R6 and transistor Q2 is also applied to diode D5 which provides a return path to ground when Q2 is made to conduct by a positive pulse from detector 16 on line 18a. This causes D5 to also conduct and C2 to discharge through D5 and Q2. The ramp generator 74 is thus reset and a new ramp initiated. In the absence of a pulse from the detector on line 18a, the ramp voltage will continue to rise. It is thus evident that the peak voltage level of the ramp is directly related to the pulse period.

A 741-type op-amp 76 is used in a differential mode to compare the peak of the linear ramp voltage from generator 74 with the voltage from the loop-skip bus (A) as established by the loop skip control 30. Differences between site-control units utilizing a common skip control bus are normalized with respect to a common pulse period by the network comprising op-amp A1, the potentiometer P2, resistor R8, and capacitor C3. The latter keeps noise spikes from affecting the comparing operation. Differences in ramp generators are equalized using potentiometer P1 to adjust the linear ramp generator 74 output voltage. The ramp output voltage is also taken from potentiometer P1 and applied to the emergency override circuit 48 via connection to bus (C). This voltage is effective only when it exceeds the normal trigger level voltage by a substantial amount. This excessive level overcomes the constant reference level causing D8 to conduct and activate the emergency override circuit 48. The ramp-fail detector 86 becomes activated if the current through the linear ramp generator 74 should cease. If the ramp generator is operating normally, transistor Q4 is conducting and LED-2 is shunted "off". Also, the Q4 collector voltage is higher than the voltage on the fail bus (D) and diode D9b is reverse biased. In this circumstance, the ramp fail detector circuit 86 does not influence the voltage on bus (D). Alternately, should the ramp generator 74 fail, no voltage is developed across R9, Q4 is biased "off", and collector current no longer flows through resistor R10. This condition results in LED-2 conducting, diode D9b conducting by reason of being forward biased by the drop in voltage across R10, and the fail bus (D) dropping to a voltage level which activates the automatic circuit failure bypass circuit 26.

The input conditioner also has a detector failure monitoring circuit 72b comprising transistor Q1 which is biased in a non-conducting state by a positive voltage level from the detector oscillator via line 18b. Resistor R11 completes the detector fail circuit and the capacitor C4 is a high frequency noise filter. Should the voltage level on line 18b drop to zero because of detector oscillator failure, Q1 will conduct drawing current through R15, LED-1, R12, and D9a. Thus, LED-1 will be lit and the voltage on the fail bus (D) will be pulled down to a level which activates the failure bypass circuit 26.

With respect to the section 24B portion of site control 24 as illustrated in FIG. 5, a positive reference voltage is obtained from the collector of transistor Q5 by means of voltage divider comprising resistors R16 and R17. Normally, the input from the comparator 76 is positive which in turn holds the emitter of Q6 near ground potential. Resistor R18, capacitor C5, and diode D10 provide input filtering of the signal from the comparator 76. During start, the start bus (F) goes positive driving the base of transistor Q6 positive and, therefore, into conduction which in turn drives the base of transistor Q8 to cutoff. As transistor Q8 in the flip-flop 80 is cut off, the base of transistor Q7 goes positive causing the emitter of Q7, which is a follower, to likewise go positive. The positive voltage at the emitter of Q7 is returned to the base of transistor Q6 and maintains Q6 in a conducting condition after the positive start voltage has been relieved. Diode D-11 and resistor R19 decouple the start bus from transistor Q6 after the start voltage has been reduced. This lockup circuit keeping Q7 positive maintains the drive on transistor Q14 and the green lamp indicator 24a lit. Resistor R22 connected to transistor Q14 from Q7 is to prevent excessive currents from flowing through Q7 and Q14 to ground. When the linear ramp voltage exceeds the level on the loop skip bus (A), the voltage from the comparator 76 goes negative and transistor Q5 is cut off. The emitter of Q6 achieves the positive voltage established by the R16 and R17 divider and, since Q6 is conducting, the collector likewise goes positive. This biases transistor Q8 positive and in the opposite conductive state so that the flip-flop comprising transistors Q8 and Q9 reverts to the opposite state. With Q9 no longer conducting, Q10 becomes a positive emitter follower which provides bias to transistor Q15 and drives the red lamp 24b "on" to indicate trouble. Resistor R29 here again prevents excessive current through transistors Q10 and Q15 and a capacitor C8 is used for noise filtering.

Since Q8 is now conducting, stop bus (B) is pulled to ground level through diode D13 and belt "shut-down" is initiated via the stop control circuit 46. If the status hold bus (E) goes negative, diode D12 will conduct current through R20 thus holding Q6 in its non-conducting state so no further change may be effected in the status of indicators 24a and 24b by other site controllers. Thus, any subsequent status of Q5 is overriden.

The detector power on line 18c is supplied by a regulating circuit 70. The base of transistor Q13 follows the output voltage and since the base of transistor Q12 returns to a +17-volt main supply which is greater than the regulated reference +12a, Q13 will conduct and the base of Q12 will remain close to +12a plus the Q12 transistor bias. Short circuit protection is included since when the 18c line is shorted, the voltage drop across the series resistor R31 will bias Q11 into conduction and this in turn will lower the driving voltage on Q12 as the voltage drop across resistor R32 increases. If the detector power fails for any reason, the voltage drop across LED-3 will increase and this will indicate the failure.

Figure 6:
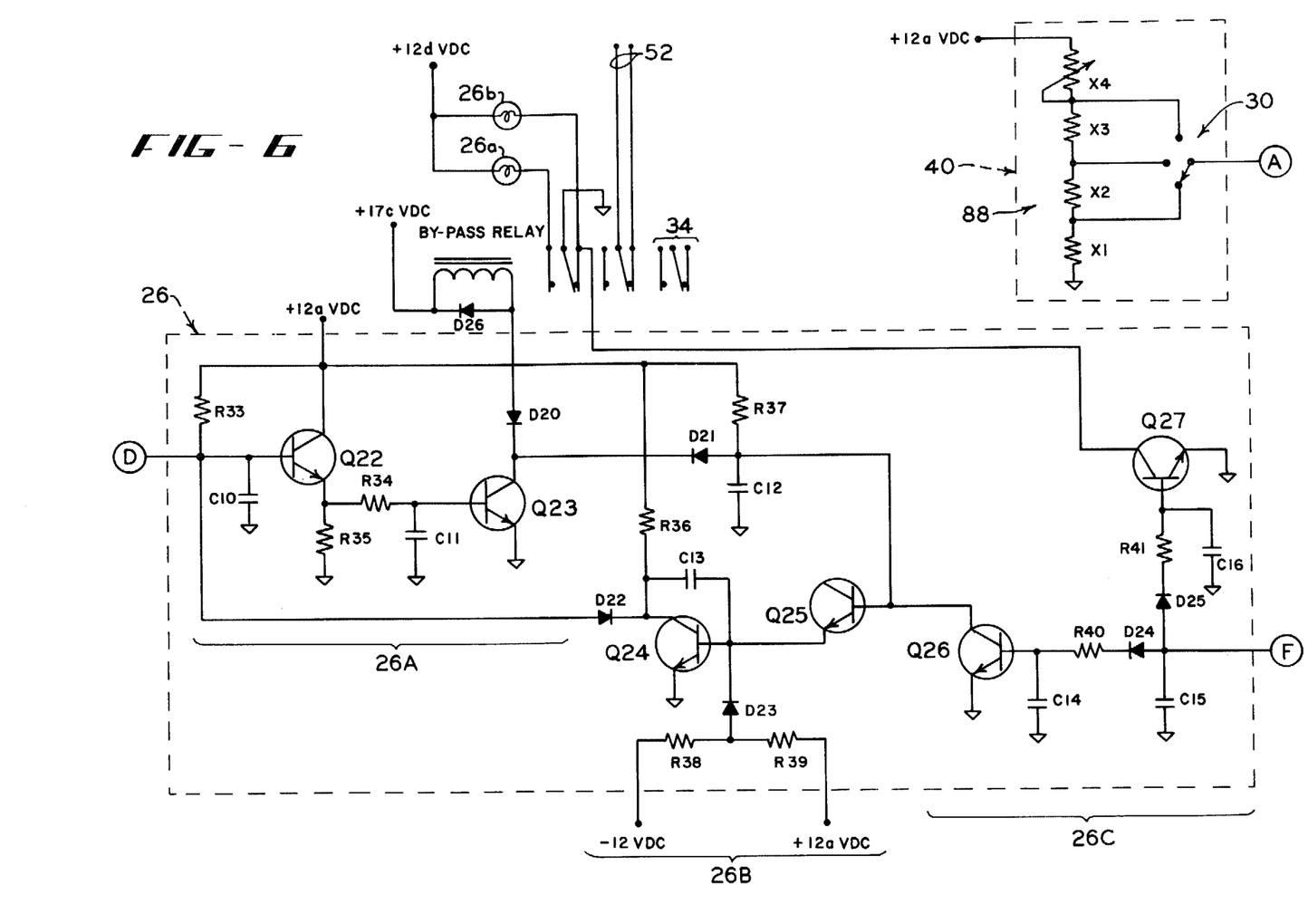
FIG. 6 is an electrical schematic of the automatic failure bypass and sensor loop skip circuits shown in FIG. 2.

In FIG. 6, the automatic circuit failure bypass 26 and loop skip circuit 40 are schematically illustrated. The circuit failure bypass 26 comprises a relay driver circuit 26A, a lockup circuit 26B, and a start control circuit 26C, with the bypass relay shown in deactivated "fail" condition. The loop skip circuit comprises a voltage divider indicated at 88 which changes the voltage on the timing bus (A) to skip 1, 2, or 3 loop periods by varying the reference voltage fed to the op-amp circuit 76. In the relay driver circuit 26A, the base of transistor Q22 is positive by virtue of resistor R33 returned to the +12a VDC main supply. The emitter of transistor Q22 is, therefore, also positive and Q22 conducts during the period the emitter is positive. A capacity filter C10 protects the input from transients and this is followed by another noise filter C11. Resistor R34 also limits current through transistors Q22 and Q23. With Q22 conducting, relay driver transistor Q23 also conducts activating the fail-safe bypass relay. In this condition, the protect light 26a is "on" and the circuit 52, tending to defeat the stop relay, is open. The positive base voltage on Q22 is likewise applied to transistor Q24 through decoupling diode D22. Diode 26 quenches the negative transient from the relay inductance, and diode D20 decouples the relay drain when positive levels appear on transistor Q23. When Q23 is conducting, the voltage on the base of Q25 is near ground potential. Q25 is used as a Zener diode and Q24 is biased to non-conduction as established by diode D23 and the voltage divider comprising R38 and R39. When the fail bus (D) goes negative, Q22 and Q23 stop conducting, while the base of Q25 goes positive and Q24 conducts which locks Q22 and Q23 in the "off" state because of conduction through diode D22. The bypass relay is thus deactivated and the belt stop circuit, fed by line 52 to the stop relay, is closed. Resistor R36 to the collector of Q24 provides a positive return for recovery via the start circuit 26c. During start, positive start voltage on bus (F) is coupled to diode D24 to cause transistor Q26 to conduct which consequently reduces the bias on Q24, thus freeing the lock circuit which can then be restrained by a normal positive voltage on the fail bus (D). The resistor R40 and condensor C14 in the base circuit of Q26 limit start bus loading and filter out unwanted transients. When the system is bypassed by the start switch and the start bus (F) held positive as a result, the yellow light 26b status is maintained by conduction of Q27 regardless of the relay status. Transistor Q22 in the relay driver circuit also acts as a fail bypass when the positive 12-volt supply fails since it is cut off under these conditions.

Figure 7:
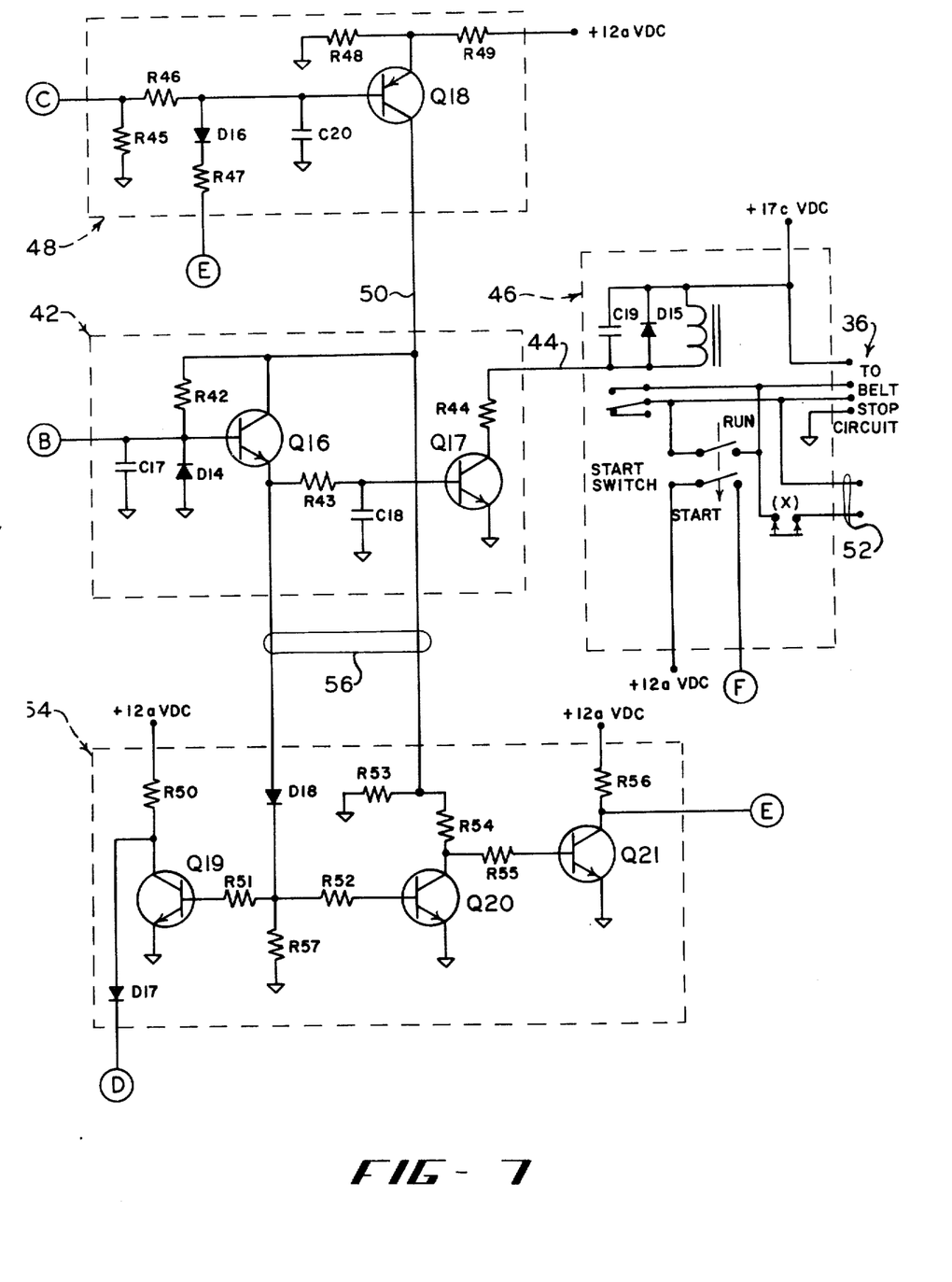
FIG. 7 is an electrical schematic of the emergency override, stop control, and status hold circuits shown in FIG. 2.

Proceeding now to the emergency override stop control and status hold circuitry as shown in FIG. 7, in normal operation the stop bus (B) has a positive potential which when applied to transistor Q16 of the stop control 42 keeps this transistor conducting which in turn causes the emitter to be biased positively and subsequently causes transistor Q17 to conduct by virtue of its positive base. Conduction of Q17 activates the stop relay circuit 46 which keeps the belt stop circuit closed. The usual capacitor and negative transient filter is used on the input of Q16. Resistor R43 at the emitter followed by a condensor C18 limit the current through transistors Q16 and Q17 and provide additional filtering. A diode D15 across the relay is used to quench negative transients and a large capacitor C19 is used to introduce a delay which allows the circuit failure bypass to operate before the stop relay can drop out. The start switch has two functions, (1) to bypass the belt stop circuit and allow the belt to get up to speed, and (2) to provide a positive level on start bus (F). Current to stop control transistor Q16 must pass through transistor Q18 in the emergency override circuit 48 which obtains its emitter bias from the +12a VDC main via the divider circuit comprising resistors R48 and R49. Transistor Q18 is normally biased into conduction by the return path ground through resistors R45 and R46 in the base circuit and the fact that the emergency override bus (C) is normally decoupled by a diode D16 to a negative level. When the emergency override bus (C) is driven positive by a positive-going linear ramp which exceeds the normal limits, Q18 is biased to cutoff which likewise cuts off Q16 and Q17 which deactivates the belt stop relay and stops the belt. A capacitor C20 is used for noise filtering. When the belt stops and pulses are no longer delivered, the emergency override bus (C) will go positive due to the increased linear ramp voltage, however, diode D16 and limiting resistor R47 are returned to the status hold bus (E) which is at ground potential at this instant in time. Thus, transistor Q18 is held in its conductive state because, for a normal belt stop signal, circuit constants are such that the status hold signal takes precedence over emergency override bus signals applied to the base of Q18. When Q16 is cut off by a negative stop bus (B) signal, Q20 in the status hold is likewise biased off because of the base return path through resistors R52 and R57. This increases the base current of transistor Q21 through series resistor R55 because of the return through resistor R54 to the positive level supplied by emergency override transistor Q18. Transistor Q21 now conducts and the status hold bus (E) drops to near zero. When this occurs, in addition to other actions of this bus, the emergency override transistor Q18 is maintained in conduction since the bias level is now controlled by current through diode D16 and the limiting resistor R47. Thus, the status hold locks out the emergency override circuitry when a normal belt stop signal appears on the stop bus (B) or when the system fail detection circuits are activated. At all other times, however, the emergency override circuit is active and will provide a belt stop signal should the op amp 76, gate 78, or flip-flop 80 circuits fail. A normally positive signal on the emitter of transistor Q16 is also coupled through a diode D18 and a limiting resistor R51 to the base of transistor Q19. This causes Q19 to normally conduct bringing the collector near ground potential. This ground potential is normally decoupled from the normal positive fail bus (D) by diode D17. If the stop control should be activated, transistor Q16 is cut off and the base of Q19 goes to ground which causes it to no longer conduct and the collector rises to a positive voltage. If fail bus (D) now attempts to go negative, the low impedance of resistor R50 to +12a volts and the forward conduction of diode D17 will not allow the fail bus to go negative. This prevents the system failure bypass circuit from overriding a legitimate stop signal on the stop bus (B). As shown in the stop relay circuitry 46, the start switch provides a positive level to the start bus (F) and at the same time shorts the belt stop circuitry. Removing the jumper at X will disable the automatic bypass circuitry and allows the belt to stop with either belt failure or system failure.

While certain representative embodiments and details have been shown for the purpose of illustrating the invention, it will be apparent to those skilled in the art that various changes and modifications may be made therein without departing from the spirit or scope of the invention.

For example, a counting circuit may be substituted in place of the ramp generator 74, op-amp 76, and ramp failure detector 86, that is periodically reset by pulses from the detector. Failure to reset the counter due to an absent pulse or pulses results in an output signal to the gate 78 that switches the flip-flop to its alternate state for a condition "abnormal" indication. Resetting of the counter may be adjusted to provide the sensor loop skip feature herebefore described.

What is claimed is:

1. In combination with an endless belt conveyor having a drive means responsive to on/off control signals, an electronic control system for monitoring the operating condition of the belt comprising:
   1. sensor means associated and movable with the belt and adapted to be open-circuited upon the occurrence of damage to the belt;
   2. a detector circuit mounted in fixed relative position to the belt and responsive to the proximate passage of the sensor means to provide a periodic pulse output signal indicative of the close-circuited condition of the sensor means; and
   3. a master control unit comprising:
      A. a site control circuit coupled to the detector circuit output and responsive to the presence or absence of pulses from the detector circuit to condition the pulse signal to a threshold level indicative of a preselected pulse period established for successive close-circuited sensors and to compare the threshold to a preselected reference level;
      B. a stop relay coupled to the conveyor drive means to control the state of the drive means according to its energization; and
      C. a stop control circuit intercoupling the site control and stop relay circuits to monitor circuit operations and to determine the validity of all site control output signals, said stop control circuit providing on/off control signals to the stop relay circuit to de-energize the relay only when the conditions for validity are met and the threshold as established in the site control exceeds the reference and to maintain the relay energized under all other validity/threshold condition combinations.

2. The control system as set forth in claim 1, wherein the site control circuit comprises:
   a. a conditioner circuit coupled to accept the detector circuit output and responsive to the presence or absence of pulses to provide an output conditioned voltage the level of which is indicative of the presence or absence of pulses;
   b. a ramp generator circuit coupled and responsive to the conditioned voltage to provide a ramp voltage signal having a cutoff level determined by the presence of pulses to the conditioner circuit;
   c. a reference voltage source;
   d. an operational amplifier coupled to accept the reference voltage and the ramp generator voltage level to provide an output voltage signal indicative of the difference between the two voltages;
   e. a gate circuit coupled to receive the voltage indicative of the difference voltage from the op-amp;
   f. a condition indicating circuit; and
   g. a flip-flop circuit interconnecting the gate, condition indicating, and stop control circuits, said gate circuit providing a first output signal when the ramp voltage is less than the reference voltage and a second output signal when the ramp voltage is greater than the reference voltage, the first output maintaining the flip-flop in a state such that the indicating circuit is held in a "condition normal" to indication while said second output switches the flip-flop such that the indicating circuit is held in a "condition abnormal" indication and a signal from the flip-flop is provided to the stop control to shut down the conveyor.

3. The control system as set forth in claim 2, wherein the condition indicating circuit comprises green and red lamp and lamp driver circuits, said green lamp providing a "normal" condition indication when switched "on" by the green lamp driver circuit that is maintained conductive by reason of the reference voltage exceeding the ramp voltage while said red lamp provides an "abnormal" condition indication when switched "on" by the red lamp driver circuit that is maintained conductive by reason of the ramp voltage exceeding the reference voltage.

4. The control system as set forth in claim 2, wherein the reference voltage source comprises a loop-skip circuit adapted to be switched into one of a plurality of voltage levels such that the ramp voltage must increase by the amount of the loop-skip voltage before the stop relay circuit is deenergized and the conveyor stopped.

5. The control system as set forth in claim 2, wherein the master control unit further comprises an emergency override circuit intercoupling the ramp generator and the stop control circuits to provide an output signal to the stop control circuit that effects shutdown of the conveyor when the ramp voltage exceeds a specified upper limit.

6. The control system as set forth in claim 5, wherein the master control unit further comprises a status hold circuit interconnecting the site control, stop control, and emergency override circuits to provide lockout of the emergency override circuit when a normal stop signal is received from the site control circuit.

7. The control system as set forth in claim 2, wherein the master control unit further comprises an automatic circuit failure bypass circuit and the site control circuit further comprises a ramp voltage failure detection circuit, said ramp failure circuit connected and responsive to the ramp generator output to provide an output signal indicative of the existence of a ramp voltage, said circuit failure bypass circuit interconnecting the ramp failure and stop relay circuits to defeat the stop relay and maintain continued operation of the conveyor even though a signal from the ramp failure circuit is indicative of the absence of a ramp voltage.

8. The control system as set forth in claim 1 wherein a plurality of detector circuits are located along the length of the belt and the master control unit further comprises (a) an equal plurality of site control circuits coupled each to a respective detector circuit with the outputs of all site control circuits interconnected and coupled to the stop control circuit such that an output signal from any one site control circuit that is indicative of a change in the pulse period from its respective detector circuit effects a signal to the stop control circuit that de-energizes the stop relay circuit, and (b) a status hold circuit interconnecting the site control circuits and the stop control circuit to maintain the status condition of the remaining plurality of site control circuits at the time an abnormal sensor condition is first sensed by one of the detectors.

9. The control system as set forth in claim 1, wherein the master control unit further comprises an automatic circuit failure bypass circuit interconnecting the site control and stop relay circuits to defeat the stop relay in response to a failure of the site control circuit and maintain continued operation of conveyor even though the stop control deenergizes the stop relay in an attempt to shut down the conveyor.

10. The control system as set forth in claim 9, wherein the automatic circuit failure bypass circuit includes an indicating circuit providing a normal condition indication and a circuit failure condition indication.

11. The control system as set forth in claim 1, wherein the site control circuit includes an electronic counting circuit that is periodically reset by the pulses from the detector and failure to reset the counter prior to its reaching a preselected threshold establishes an output signal to the stop control circuit for deenergizing the stop relay circuit.

12. In combination with an endless belt conveyor driven by drive means responsive to on/off control signals and having sensor means associated and movable with the belt, and detector circuit means mounted in fixed relative position to the belt, said detector means responsive to the condition of the sensor means to provide output pulses indicative of the normal condition of the sensor means, an electronic master control unit comprising:

A. first circuit means coupled to the detector circuit means output to generate a ramp voltage signal that is reset by a pulse from the detector circuit, the amplitude excursion of the ramp voltage being determined by the periodicity of the pulses;

B. a source of reference voltage; and

C. second circuit means coupled to accept the reference voltage and the amplitude level of the ramp voltage from the first circuit means to compare the two voltages and provide an output signal to the conveyor drive means that is an "on" control signal when the ramp voltage is below a preset value to maintain the conveyor operative, and is an "off" control signal when the ramp voltage exceeds the preset value to shut down the conveyor.

13. The control unit as set forth in claim 12 wherein the reference voltage is supplied by a sensor loop skip circuit comprising a plurality of resistances the values of which set the reference voltage, said reference voltage establishing the number of sensors that may be open-circuited before an "off" signal is applied to the conveyor drive means.

14. The control unit as set forth in claim 12, further comprising a stop control circuit connected to be responsive to the output from the second circuit means and a stop relay circuit interconnecting the stop control circuit and the conveyor drive means, said stop control maintaining the stop relay energized and the conveyor operating as long as the ramp voltage generated by the first circuit means is periodically reset by pulses from the detector and de-energizing the stop relay to shut down the conveyor when the ramp voltage is not reset due to an absence of pulses from the detector.

15. The control unit as set forth in claim 14, further comprising an automatic circuit failure bypass circuit interconnecting the detector, first and second circuit means, and the stop relay circuit to monitor circuit operation and provide an output signal that defeats the stop relay when circuit operation is not normal even though the stop control circuit attempts to shut down the conveyor by deenergizing the relay.

* * * * *